United States Patent [19]

Daire

[11] Patent Number: 5,006,499
[45] Date of Patent: Apr. 9, 1991

[54] ZIEGLER-NATTA CATALYST AND A PROCESS FOR ITS PREPARATION

[75] Inventor: Eric Daire, Lavera, France

[73] Assignee: BP Chemicals Limited, London, England

[21] Appl. No.: 274,386

[22] Filed: Nov. 21, 1988

[30] Foreign Application Priority Data

Nov. 30, 1987 [FR] France .................. 87 16754

[51] Int. Cl.$^5$ .................. C08F 4/654; C08F 4/68
[52] U.S. Cl. .................. 502/104; 502/8; 502/9; 502/113; 502/120; 502/121; 502/122; 502/123; 502/124; 502/125; 502/126; 502/127; 502/132; 502/133; 526/124
[58] Field of Search .................. 502/8, 9, 104, 113, 502/120, 121, 122, 123, 124, 125, 126, 127, 132, 133

[56] References Cited

U.S. PATENT DOCUMENTS 4,376,062  3/1983  Hamer et al. .................. 502/9
4,654,318  5/1987  Yamamoto .................. 502/133 X

*Primary Examiner*—Patrick P. Garvin
*Attorney, Agent, or Firm*—Brooks Haidt Haffner & Delahunty

[57] ABSTRACT

A process for the preparation of a solid catalyst of the Ziegler-Natta type comprises precipitating the solid catalyst in a liquid hydrocarbon medium by reacting (A) a solution of a soluble magnesium alkoxide and (B) a transition metal halide which is a halide of Ti (IV), a halide of V (IV) or a halide of VO (III) in the presence of (C) at least one transition metal alkoxide which is free from halogen and soluble in liquid hydrocarbon. The precipitated solid catalyst consists of spheroidal particles having a mean diameter by mass of from 10 to 70 microns and a narrow particle size distribution such that the ratio of mean diameter by mass to the mean diameter by number is greater than 1.2 and smaller than 2.0.

15 Claims, No Drawings

ZIEGLER-NATTA CATALYST AND A PROCESS FOR ITS PREPARATION

The present invention relates to a solid catalyst of the Ziegler-Natta type, suitable for the polymerization of olefins, and to a process for preparing this catalyst. The solid catalyst is especially suitable for the polymerization or copolymerization of ethylene in suspension in a liquid-hydrocarbon medium or, preferably, in gaseous phase.

It is known that olefin polymerization catalyst systems of the Ziegler-Natta type consist of a solid catalyst comprising at least one compound of a transition metal belonging to subgroups IVb, Vb or VIb of the Periodic Classification of the Elements and a cocatalyst comprising at least one organometallic compound of a metal belonging to groups II or III of this Classification.

High-efficiency solid catalysts are known which comprise at least one compound of a transition metal such as titanium or vanadium, and a magnesium compound, such as a magnesium chloride compound. The co-catalyst is usually chosen from organoaluminium or organozinc compounds. The use of high-efficiency solid catalysts comprising a magnesium chloride is known to have the disadvantage of leaving highly chlorinated and corrosive catalyst residues in the polymers produced, and so relatively large quantities of neutralizing and stabilizing agents may have to be added to these polymers.

Catalysts prepared using magnesium alkoxylates are also known which may overcome or at least mitigate the problems associated with the use of magnesium chloride.

British patent No. 1 306 001 discloses a process for preparing a polymerisation catalyst consisting of (A) the reaction product obtained by reacting magnesium ethylate, titanium isopropylate and titanium tetrachloride in an inert dispersing medium and (B) an organometallic compound.

British patent No. 1 333 759 discloses a process for (co)polymerising alpha-olefins in the presence of a catalyst system comprising the reaction product of (A) a titanium compound and (B) an organoaluminium compound in which the titanium compound (A) is a reaction product obtained by the action of a tetravalent halogen-containing titanium compound on a complex metal alcoholate or successively with different alcoholates.

European patent application No. 0246599 discloses a process for (co)polymerising an olefin using a Ziegler-Natta catalyst in which the solid catalyst component is obtained by treating a magnesium alkoxide with an electron donor, a silicon alkoxylate and a titanium compound, e.g. titanium tetrachloride.

European patent application No. 0 113 937 discloses a solid catalyst component for producing (co)polymers of olefins obtained by contacting a magnesium or manganese alkoxide with another alkoxide, such as tetrabutyl titanate, to obtain a liquid and then reacting this liquid with a fluid comprising a halogenating agent and treating with an electron donor to form a solid which is post-treated with a transition metal halide. The post-treatment may not be required if the halogenating agent is a transition metal halide.

U.S Pat. No. 4,698,323 discloses a process for producing a transition metal polymerisation catalyst component comprising reacting (i) a soluble magnesium alkoxy alkoxide solubilised in an organic solvent with (ii) titanium tetrachloride.

Some of the processes which utilise magnesium alkoxide in the preparation of solid catalyst require the use of an intermediate magnesium alkoxide solid support, which may have to be prepared in a preliminary step. The quality of the catalysts produced using such processes can be variable.

This lack of reproducibility can be highly detrimental to a polymerization process, especially in gaseous phase, which is generally sensitive to variations in the quality of the catalysts employed.

It has been found that when the preparation of the catalysts involves the use of an intermediate support based, for example, on magnesium alkoxide, the active compounds based on transition metals, such as titanium or vanadium, enter into this solid support only with difficulty. As a result of this, the composition of the catalyst obtained in this manner can be relatively heterogeneous and this heterogeneity can adversely affect a polymerization process operating under stable conditions. In fact, the polymer particles formed from such catalysts may have a tendency to fall apart into fine particles when the polymerization progresses to a high degree.

Solid catalysts comprising a magnesium alkoxide generally consist of particles of ill-defined shape which produce polymer powders which have a relatively low bulk density. Furthermore, in most cases these solid catalysts have a relatively broad particle size distribution.

A relatively broad particle size distribution is particularly disadvantageous when the solid catalyst is used in a gas phase fluidised bed process because fine particles may be entrained out of the reactor with the fluidising gas and coarse particles may settle at the bottom of the reactor.

Thus, there is a need for a high efficiency, low chlorine content, solid catalyst which comprises spheroidal particles having a relatively narrow particle size distribution and which is suitable for use in industrial olefin polymerisation processes both in suspension in a liquid hydrocarbon and in gaseous phase, particularly in a fluidised bed. There is also a need for a simple process for producing such a solid catalyst.

It has now been found that it is possible to prepare such a high efficiency solid catalyst using a process which is simple, quick and inexpensive, since it comprises precipitating the solid catalyst essentially in a single stage i.e. the solid catalyst is obtained directly from compounds which are liquid or in solution in a liquid hydrocarbon. In particular, the process does not require the manufacture and the handling of an intermediate solid support based on magnesium halide or magnesium alkoxide. The solid catalyst can be obtained with excellent reproducibility and high quality. Furthermore, it is advantageously in the form of particles whose composition is relatively homogeneous from core to periphery and which have a substantially spherical shape and a relatively narrow particle size distribution.

Thus, according to the present invention a process for the preparation of a solid catalyst of the Ziegler-Natta type comprising reacting a soluble magnesium alkoxide solubilised in a liquid hydrocarbon with a transition metal halide is characterised in that the solid catalyst is precipitated in a liquid hydrocarbon medium by reacting the solution of magnesium alkoxide and transition metal halide in the presence of at least one alkoxide of a transition metal belonging to subgroups IVb, Vb or VIb of the Periodic Classification of Elements, which transition metal alkoxide is free from halogen and is soluble in the liquid hydrocarbon medium and in that the transition metal halide is selected from the group consisting of halides of titanium (IV), halides of vanadium (IV) and halides of VO(III). The precipitated solid catalyst comprising magnesium, transition metal, halogen and alkoxide is characterised in that it is in the form of spheroidal particles having a mean diameter by mass, Dm, of from 10 to 70 microns and a narrow particle size distribution such that the ratio of mean diameter by mass, Dm, to the mean diameter by number, Dn, is greater than 1.2 and smaller than 2.0 and in that the catalyst contains transition metal at its maximum valency or vanadyl groups.

The solid catalyst according to the present invention does not comprise a solid support, such as magnesium halide, magnesium alkoxide or a porous refractory oxide on which support a transition metal compound is fixed or impregnated. Instead, the solid catalyst according to the present invention is a precipitate, having a substantially uniform composition from the core to the periphery of the particles and comprising magnesium, halogen, alkoxide and a transition metal.

Although the solid catalyst is not of the supported type, it is, surprisingly, in the form of spheroidal particles. In this specification, the terms "spheroidal" or "spherical" when used in relation to the shape of the solid particles, means that the ratio of the maximum linear diameter, D, to the minimum linear diameter, d, is less than 2, preferably less than 1.8. It is a great advantage for the particles to be spheroidal because they are more tractable and can produce polyolefin powders having improved flow properties. The surface of the spheroidal particles is preferably smooth but may, for example, resemble the surface of a raspberry.

An advantage of the process according to the present invention for producing the solid catalyst is that it consists essentially of a single stage precipitation reaction.

Another advantageous property of the solid catalyst produced according to the process of the present invention is that it comprises particles having a relatively narrow particle size distribution such that the ratio of Dm/Dn is greater than 1.2 and less than 2.0. Preferably, the ratio of Dm/Dn is greater than 1.4 and equal to or less than 1.8. It has been found that the process produces few coarse particles having a diameter greater than $2 \times Dm$ and also produces few fines having a diameter less than $0.2 \times Dm$. It is possible to produce solid catalyst 90% by weight of which consists of particles falling within the range $Dm \pm 10\%$. Generally, the specific surface area of the particles is from about 10 to 80 $m^2/g$ (BET).

More particularly, the solid catalyst can contain magnesium, halogen and transition metal in proportions such that the atomic ratio of halogen to magnesium is from 1.7 to 2.3, preferably from 1.8 to a value less than 2.05, and the atomic ratio of transition metal to magnesium is from 0.1 to 0.3, preferably from 0.12 to 0.25. The halogen content by weight of the solid catalyst is advantageously less than 50%, and more particularly is between 30% and 45%. Preferably, the solid catalyst contains no electron donor compound selected from the group consisting of amines, amides, phosphines, sulphines, sulphides, sulphones, ethers, thioethers, ketones, aldehydes, alcohols, thiols and carboxylic acid esters.

However, if such an electron donor compound is used in the solid catalyst, it is preferably used in a small quantity, such that the molar ratio of the electron donor compound to the transition metal is less than 0.2, preferably less than 0.1.

The solid catalyst according to the present invention has a relatively low halogen content and consequently does not result in high levels of corrosive residues in the polyolefin produced using the catalyst.

The subgroups of the Periodic Classification of the Elements referred to in this specification are those cited in "Handbook of Chemistry and Physics", 55th edition (1971-72) by R. C. Weast, published by the Chemical Rubber Co. (U.S.A.).

The process according to the present invention involves the precipitation of the solid catalyst in a liquid hydrocarbon medium which can be, for example, one or more liquid hydrocarbons, such as n-pentane, n-hexane or n-octane.

The transition metal halide employed in the preparation of the solid catalyst is preferably selected from titanium tetrachloride, vanadium tetrachloride, vanadyl trichloride, titanium tetrabromide, vanadium tetrabromide and vanadyl tribromide. The halogenated titanium and vanadium compounds are liquid in the pure state, or soluble in a liquid hydrocarbon in the absence of any special solubilizing agent. They may be employed singly or as a mixture and may be used in the pure state or, preferably, in solution in a liquid hydrocarbon such as n-hexane or n-heptane.

The magnesium alkoxide used in the present invention is used as a solution in a liquid hydrocarbon. The magnesium alkoxide is soluble in the liquid hydrocarbon without the need for solubilising or complexing agents such as a transition metal alkoxide or aluminium alkoxide. The magnesium alkoxide can be dissolved in the liquid hydrocarbon medium in which the solid catalyst is to be precipitated. Alternatively the magnesium alkoxide can be pre-dissolved in a liquid hydrocarbon which can be the same as or different from the liquid hydrocarbon medium in which the solid catalyst is to be precipitated and then this solution of magnesium alkoxide can be mixed with the liquid hydrocarbon medium. The magnesium alkoxide can be used in the form of a solution in liquid hydrocarbon at a concentration which is preferably from 0.1 to 5 moles, preferably 0.1 to 2 moles per liter of liquid hydrocarbon medium.

The magnesium dialkoxide can have the general formula

$Mg(OR_1)(OR_2)$ in which $(OR_1)$ and $(OR_2)$ are the same or different alkoxide or alkoxyalkoxide groups. Experience shows that it is advantageous to employ a magnesium dialkoxide in which the groups $(OR_1)$ and $(OR_2)$ are alkoxide groups each of which contains a linear alkyl radical having from 6 to 12 carbon atoms or, preferably, a branched alkyl radical having from 5 to 12 carbon atoms, in particular alkoxide groups corresponding to the general formula

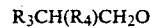

$R_3CH(R_4)CH_2O$ in which $R_3$ is an alkyl radical containing from 2 to 9 carbon atoms and $R_4$ is an alkyl radical containing from 1 to 8 carbon atoms. The total number of carbon atoms being from 5 to 12.

It is also possible to employ advantageously a magnesium dialkoxide in which the groups (OR$_1$) and (OR$_2$) are alkoxyalkoxide groups containing an ether function and having from 4 to 12 carbon atoms, in particular corresponding to the general formula $$R_5OCH(R_6)CH_2O$$

in which R$_6$ is a hydrogen atom and R$_5$ an alkyl radical containing from 2 to 10 carbon atoms, or else R$_6$ is a methyl radical and R$_5$ an alkyl radical containing from 1 to 9 carbon atoms.

The magnesium dialkoxide is preferably chosen from di(2-methyl-1-pentoxy)magnesium of formula $$Mg(OCH_2CH(CH_3)CH_2CH_2CH_3)_2$$

di(2-ethyl-1-hexoxy)magnesium of formula $$Mg(OCH_2CH(CH_2CH_3)CH_2CH_2CH_2CH_3)_2$$

and di(2-ethoxy-1-ethoxy)magnesium of formula $$Mg(OCH_2CH_2OCH_2CH_3)_2$$

The preparation of the solid catalyst according to the present invention must take place in the presence of at least one transition metal alkoxide which is an alkoxide of an element belonging to subgroups IVb, Vb or VIb of the Periodic Classification of the Elements. The transition metal alkoxides suitable for use in the process of the present invention are characterised by the fact that they contain no halogen and that they are soluble in liquid hydrocarbon, even in the absence of any solubilizing agent. In particular, the transition metal alkoxides are soluble in the liquid hydrocarbon employed for forming the solution of magnesium dialkoxide or the liquid hydrocarbon medium in which the solid catalyst is prepared.

The transition metal alkoxide is preferably vanadyl trialkoxide or is a compound of the formula Me(OR)$_x$ where Me is the transition metal, OR is an alkoxide group and x is an integer equal to the maximum valency of the transition metal. Suitable transition metal alkoxides include titanium tetraalkoxide, vanadium tetraalkoxide, zirconium tetraalkoxide and vanadyl trialkoxide, for example titanium tetra-n-propoxide, vanadium tetra-n-propoxide, vanadyl tri-n-propoxide, titanium tetraisopropoxide, vanadyl triisopropoxide, titanium tetra-n-butoxide, vanadium tetra-n-butoxide and vanadyl tri-n-butoxide.

Although the mechanism by which the soluble halogen-free transition metal alkoxide is involved in the formation of the solid catalyst is not accurately known at present, it has nevertheless been found that its presence in the course of the preparation of the solid catalyst is indispensable, especially for the purpose of improving the particle size distribution of the catalyst and of controlling the substantially spherical shape of the particles of this catalyst.

It has been observed that it is possible to employ at least one additional alkoxide of an element of subgroups IIIa or IVa of the Periodic Classification of elements. The additional alkoxide should contain no halogen, should not act reductively towards the transition metal halide and must be soluble in the organic solvent in the absence of any solubilising agent. Suitable additional alkoxides include boron alkoxide, aluminium alkoxide and silicon alkoxide. In particular, it is possible to employ a boron trialkoxide such as boron triethoxide or boron tributoxide. It is also possible to employ an aluminium trialkoxide such as aluminium triisobutoxide or aluminium tri-sec-butoxide. More advantageously, it is possible to choose a silicon alkoxide containing no function acting reductively towards a transition metal compound, in particular containing no Si-H bond and corresponding to the general formula $$Si(R_7)_n(OR_8)_{4-n}$$

in which R$_7$ is an alkyl or aryl radical containing up to 12 carbon atoms, R$_8$ is an alkyl radical containing from 1 to 6 carbon atoms and n is a number equal to or greater than 0 and smaller than or equal to 3. It is possible, for example, to employ a silicon tetralkoxide such as silicon tetraethoxide, silicon tetra-n-propoxide or silicon tetraisopropoxide, or else a silicon dialkoxide or trialkoxide such as methyl triethoxysilane or phenyl triethoxysilane.

It has also been observed, surprisingly, that the properties of the solid catalyst as a whole and in particular the shape, surface aspect and particle size distribution are better when use is made of the combination of the transition metal alkoxide and the additional alkoxide.

In order to obtain a solid catalyst having the desired characteristics, it is advantageous to carry out its preparation in an inert liquid hydrocarbon medium which has the property of being a solvent for the magnesium dialkoxide, the transition metal halide, the transition metal alkoxide and the additional alkoxide if used. One or more aliphatic liquid hydrocarbons such as n-hexane or n-heptane, by itself or mixed, are generally employed. In practice, it is convenient to employ, in the liquid medium where the catalyst is prepared, quantitites of liquid hydrocarbon such that this medium contains between 0.05 and 5 moles of magnesium per liter. The preparation of the solid catalyst may, furthermore, be carried out in the presence of a small quantity of an electron donor compound selected from the group consisting of amines, amides, phosphines, sulphoxides, sulphones, ethers, thioethers, ketones, aldehydes, alcohols, thiols and carboxylic acid esters. The quantity of the electron donor compound used during the preparation is such that in the solid catalyst the molar ratio of the electron donor compound to the transition metal is less than 0.2, more particularly less than 0.1. The electron donor compound is not an essential element of the present preparation. Its presence generally reduces the activity of the solid catalyst in the olefin polymerisation. Preferably, the solid catalyst is prepared in the absence of such an electron donor compound. It is advantageous, moreover, to carry out this preparation at a temperature of from −20° C. to 100° C., preferably from 0° C. to 80° C.

The preparation of the solid catalyst consists essentially of a single stage precipitation reaction. The reaction is preferably carried out with stirring in the liquid hydrocarbon medium at a temperature in the range from −20° C. to 100° C. using quantities such that:

the molar ratio of the quantity of the magnesium dialkoxide to the quantity of the transition metal halide is from 0.2 to 4, preferably from 0.5 to 2;

the molar ratio of the quantity of the transition metal alkoxide to the quantity of the transition metal halide is from 0.05 to 5, preferably from 0.1 to 2, and the molar ratio of the quantity of the transition metal alkoxide to the quantity of the additional alkoxide, if used, is from 0.5 to 20, preferably from 1 to 10.

Analysis of the solid catalyst shows that this product contains one or more compounds of transition metal which have not been reduced. It shows, furthermore, that the quantity of transition metal which is precipitated with the magnesium dialkoxide is relatively large, since the molar ratio of the quantity of transition metal to the quantity of magnesium is from 0.1 to 0.3, preferably from 0.12 to 0.25. What is more, analysis of the solid catalyst also shows that the halogen content of this catalyst is relatively low, since the molar ratio of the quantity of halogen to the quantity of magnesium is from 1.7 to 2.3, preferably from 1.8 to less than 2.05. In particular, it has been noted that when this molar ratio is too low, for example smaller than 1.7, the solid catalyst gives a polyethylene of very low bulk density.

The preparation of the solid catalyst of the invention may be carried out according to various alternative procedures. Given that this preparation consists essentially of a precipitation, the specialist is aware that physical factors such as the viscosity of the medium, the type and rate of stirring, the conditions of use of the various constituents, the stirring and the contact time can, everything else being unchanged, play an important part in the shape, the structure, the size and the particle size distribution of the catalyst particles.

In particular, a solution of the magnesium dialkoxide in a liquid hydrocarbon may be added slowly to a hydrocarbon medium containing the titanium or vanadium halide; the transition metal alkoxide and additional alkoxide, if used, being either present in the hydrocarbon medium, or else being added to this medium at the same time as the solution of the magnesium dialkoxide, or else being introduced by both these methods simultaneously.

It is also possible to add the titanium or vanadium halide, the transition metal alkoxide and optionally an additional alkoxide of elements of sub-groups IIIa, IVa, slowly and preferably simultaneously to the liquid hydrocarbon medium containing the magnesium dialkoxide.

It is possible to add the titanium or vanadium halides and a solution of magnesium dialkoxide in a liquid hydrocarbon slowly and simultaneously to the liquid hydrocarbon medium containing the transition metal alkoxide and optionally an additional alkoxide of the elements of sub-groups IIIa, or IVa.

In all cases, it is preferable that the addition(s) carried out in the hydrocarbon medium should be relatively slow and should take approximately between 1 and 24 hours, preferably between 2 and 10 hours. After this or these slow addition(s), the mixture obtained may advantageously be kept stirred for a period of between 1 and 10 hours. The solid catalyst which is thus precipitated in the liquid hydrocarbon medium is preferably subjected to one or more washings with the aid of one or more inert liquid hydrocarbons and may be recovered in the form of a dry powder, for example, by filtration or by evaporation of the liquid hydrocarbon(s).

The solid catalyst may be employed as such and directly in an olefin polymerisation or copolymerisation, particularly of ethylene, in suspension in a liquid hydrocarbon, or in gaseous phase in a fluidized bed reactor, in the presence of a cocatalyst consisting of at least one organometallic compound containing a metal of groups II or III of the Periodic Classification of the Elements.

The solid catalyst may also be converted into a prepolymer before being used in a polymerisation. In this case, the prepolymer is obtained by bringing the solid catalyst into contact with one or more olefins, preferably ethylene, in the presence of a cocatalyst consisting of at least one above mentioned organometallic compound. The prepolymer may contain from 1 to 200 g of polymer, preferably from 10 to 100 g of polymer, per mole of transition metal. Furthermore, it contains a quantity of cocatalyst such that the atomic ratio of the quantity of metal in the cocatalyst to the quantity of transition metal is from 0.1 to 10, preferably from 0.3 to 5.

The cocatalyst is advantageously an organoaluminium compound or an organozinc compound. In all cases, it may be used directly in the polymerisation medium at the same time as the solid catalyst. It may be partly or completely mixed with the catalyst or prepolymer before being used in the polymerisation medium.

The solid catalyst is particularly highly suitable for the manufacture of ethylene homopolymers or ethylene copolymers with at least one alpha-olefin containing from 3 to 8 carbon atoms, especially according to a gas phase polymerisation process in a fluidized bed reactor. These ethylene polymers or copolymers have a relatively narrow molecular weight distribution and a low halogen content. In addition, they are in the form of a powder consisting of substantially spherical particles which have a narrow particle size distribution and a high bulk density.

The following non-limiting Examples illustrate the present invention.

EXAMPLE 1

Preparation of a Catalyst (B)

A solution (A) was prepared by mixing, at ambient temperature (20° C.) and under a nitrogen atmosphere, 230 ml of n-hexane, 61.1 ml of a solution containing 66 millimoles of titanium tetrachloride in n-hexane and 9 ml of titanium tetra-n-propoxide and stirring this mixture for 30 minutes at ambient temperature. The mixture was introduced, under a nitrogen atmosphere, into a 2 liter glass reactor fitted with a stirring system rotating at 350 revolutions per minute. 293 ml of a solution containing 100 millimoles of di(2-methylpentoxy)magnesium in n-hexane were then slowly added to the reactor over 330 minutes, at a uniform rate, with stirring, and at ambient temperature. At the end of this time, the mixture was stirred for a further one hour. The solid catalyst (B) precipitated was washed 5 times with 500 ml of n-hexane at ambient temperature. It contained magnesium, titanium and chlorine in such proportions that the atomic ratio of titanium to magnesium was 0.16 and the atomic ratio of chlorine to magnesium was 1.95. The solid catalyst (B) consisted of spheroidal particles having a mean diameter by mass Dm of 31 microns and a ratio of Dm/Dn of 1.8 where Dn is the mean diameter by number.

The mean diameter by mass (Dm) and the mean diameter by number (Dn) of the particles were measured on the basis of microscope examinations with an OPTOMAX image analyser (Micro Measurements Limited GB). The measuring principle consists in obtaining from the experimental study by optical microscopy of a population of particles a table of absolute frequencies showing the number $(n_i)$ of particles belonging to each class (i) of diameters, each class (i) being characterised by an intermediate diameter (d$_i$) comprised between the limits of the said class. According to the French Norm NF X 11-630 of June 1981, Dm and Dn are given by the following formula:

$$\text{mean diameter by mass: } Dm = \frac{\Sigma ni\ (di^3)\ di}{\Sigma ni\ (di^3)}$$

$$\text{mean diameter by number: } Dn = \frac{\Sigma ni \cdot di}{\Sigma ni}$$

The ratio Dm:Dn characterises the particle size distribution.

Measurement by the OPTOMAX image analyser is performed by means of an inverted microscope which makes it possible to examine suspensions of particles at an enlargement between 16× and 200×. A television camera picks up the images given by the inverted microscope and transmits them to a computer, which analyses the images line by line and point by point on each line so as to determine the dimensions or diameters of the particles and then to classify them.

EXAMPLE 2

Preparation of a Catalyst (D)

The procedure was the same as in Example 1, except that instead of employing the solution (A), a solution (C) was used, which was prepared by mixing, at ambient temperature (20° C.) and under a nitrogen atmosphere, 230 ml of n-hexane, 61.1 ml of a solution containing 66 millimoles of titanium tetrachloride in n-hexane, 9 ml of titanium tetra-n-propoxide and 4.8 ml of phenyl triethoxysilane and stirring this mixture for 30 minutes at ambient temperature.

The solid catalyst (D) precipitated contained magnesium, titanium and chlorine in such proportions that the atomic ratio of titanium to magnesium was 0.12 and the atomic ratio of chlorine to magnesium was 2.02. The solid catalyst (D) consisted of spheroidal particles having a mean diameter by mass Dm of 35 microns and a ratio of Dm/Dn of 1.4.

EXAMPLE 3

Preparation of a Catalyst (F)

The procedure was the same as in Example 1, except that instead of employing the solution (A) a solution (E) was used, prepared by mixing, at ambient temperature (20° C.) and under a nitrogen atmosphere, 230 ml of n-hexane, 61.1 ml of a solution containing 66 millimoles of titanium tetrachloride in n-hexane, 9 ml of titanium tetra-n-propoxide and 4 ml of methyl triethoxysilane, and by stirring this mixture for 30 minutes at ambient temperature.

The solid catalyst (F) precipitated contained magnesium, titanium and chlorine in such proportions that the atomic ratio of titanium to magnesium was 0.18 and the atomic ratio of chlorine to magnesium was 2.04. The solid catalyst (F) consisted of spheroidal particles having a mean diameter by mass, Dm, of 32 microns and a ratio Dm/Dn of 1.5.

EXAMPLE 4

Preparation of a Catalyst (H)

The procedure was the same as in Example 1, except that instead of employing the solution (A), a solution (G) was used, prepared by mixing, at ambient temperature (20° C.) and under nitrogen atmosphere, 230 ml of n-hexane, 61.1 ml of a solution containing 66 millimoles of titanium tetrachloride in n-hexane, 9 ml of titanium tetra-n-propoxide, 4 ml of methyl triethoxysilane and 0.6 ml of 2-methyl-1-pentanol, and stirring this mixture for 30 minutes at ambient temperature.

The solid catalyst (H) precipitated contained magnesium, titanium and chlorine in such proportions that the atomic ratio of titanium to magnesium was 0.14 and the atomic ratio of chlorine to magnesium was 1.94. The solid catalyst (H) consisted of spheroidal particles having a mean diameter by mass, Dm of 30 microns and a ratio Dm/Dn of 1.4.

EXAMPLE 5 (COMPARATIVE)

Preparation of a Catalyst (J)

The procedure was the same as in Example 1, except that instead of employing the solution (A) a solution (I) was used, prepared by mixing, at ambient temperature (20° C.) and under nitrogen atmosphere, 200 ml of n-hexane, 92.6 ml of a solution containing 100 millimoles of titanium tetrachloride in n-hexane and 7.5 ml of 2-methyl-1-pentanol, and by stirring this mixture for 30 minutes at ambient temperature.

The solid catalyst (J) precipitated contained magnesium, titanium and chlorine in such proportions that the atomic ratio of titanium to magnesium was 0.06 and the atomic ratio of chlorine to magnesium was 2.02. Thus, this catalyst contained a relatively low quantity of titanium relative to magnesium. Furthermore, the solid catalyst (J) consisted of particles having an indeterminate shape and a ratio Dm/Dn of 2.9.

EXAMPLE 6

Preparation of a Catalyst (L)

The procedure was the same as in Example 1, except that instead of employing the solution (A), a solution (K) was used, prepared by mixing, at ambient temperature (20° C.) and under nitrogen atmosphere, 210 ml of n-hexane, 69.5 ml of a solution containing 75 millimoles of titanium tetrachloride in n-hexane, 20.4 ml of titanium tetra-n-propoxide, and 4 ml of methyl triethoxysilane, and stirring this mixture for 30 minutes at ambient temperature.

A solid catalyst (L) precipitated contained magnesium, titanium and chlorine in such proportions that the atomic ratio of titanium to magnesium was 0.12 and the atomic ratio of chlorine to magnesium was 1.83. The solid catalyst (L) consisted of spheroidal particles having a mean diameter by mass, Dm, of 29 microns and a ratio Dm/Dn of 1.5.

EXAMPLE 7

Preparation of a Catalyst (N)

The procedure was the same as in Example 1, except that instead of employing the solution A, a solution (M) was used, prepared by mixing, at ambient temperature (20° C.) and under nitrogen atmosphere, 230 ml of n-hexane, 61.1 ml of a solution containing 66 millimoles of titanium tetrachloride in n-hexane, 11.2 ml of titanium tetra-n-butoxide and 3.4 ml of methyltriethoxysilane, and stirring this mixture for 30 minutes at ambient temperature.

The solid catalyst (N) precipitated contained magnesium, titanium and chlorine in such proportions that the atomic ratio of titanium to magnesium was 0.17 and the atomic ratio of chlorine to magnesium was 1.97. The solid catalyst (N) consisted of spheroidal particles having a mean diameter by mass, Dm, of 33 microns and a ratio Dm/Dn of 1.4.

EXAMPLE 8

Preparation of a Catalyst (P)

100 ml of n-hexane and 133 ml of a solution containing 100 millimoles of di(2-methylpentoxy) magnesium in n-hexane were introduced under nitrogen atmosphere and at ambient temperature (20° C.) into a 2 liter glass reactor fitted with a stirring system rotating at 350 revolutions per minute. A solution (O) which had been prepared by mixing, at ambient temperature and under nitrogen atmosphere, 50 ml of n-hexane, 61.1 ml of a solution containing 66 millimoles of titanium tetrachloride in n-hexane and 9 ml of titanium tetra-n-propoxide were then introduced into the reactor slowly over 75 minutes and at a uniform rate. At the end of this time, the mixture was stirred for a further hour. The solid catalyst (P) precipitated was washed 5 times with 500 ml of n-hexane at ambient temperature. The solid catalyst contained magnesium, titanium and chlorine in such proportions that the atomic ratio of titanium to magnesium was 0.18 and the atomic ratio of chlorine to magnesium was 1.94. The solid catalyst (P) consisted of spheroidal particles having a mean diameter by mass, Dm, of 30 microns and a ratio Dm/Dn of 1.8.

EXAMPLE 9

Polymerisation of Ethylene in Suspension in n-hexane

Ethylene was polymerised in suspension in n-hexane using the catalysts produced in Examples 1 to 8.

2 liters of n-hexane, 6 millimoles of triethylaluminium (TEA), and a quantity of catalyst corresponding to 0.9 millimole of titanium were introduced under nitrogen into a 5 liter stainless steel reactor fitted with a stirring system rotating at 750 revolutions per minute. The reactor was heated to 80° C. and hydrogen and ethylene were introduced therein. The pressure in the reactor was kept constant by the addition of ethylene during the polymerisation. At the end of the polymerisation, the polymer was filtered off and dried. The operating conditions and the characteristics of the polymers obtained are given in Table 1.

EXAMPLE 10

Prepolymerisation in Suspension in n-hexane 2 liters of n-hexane were introduced under nitrogen into a 5 liter stainless steel reactor fitted with a stirring system rotating at 750 revolutions per minute. The reactor was heated to 70° C. and 20 millimoles of TEA and a quantity of solid catalyst (D) prepared in Example 2, corresponding to 3 millimoles of titanium were introduced therein. Hydrogen was then introduced therein so as to give a partial pressure of hydrogen of 0.05 MPa, followed by ethylene at a uniform rate of 85 g/h for 280 minutes. At the end of this time the reactor content was transferred to a rotary evaporator and the n-hexane was evaporated off under reduced pressure. A prepolymer (Q) was thus obtained which was in the form of a powder consisting of spheroidal particles, having a narrow particle size distribution.

EXAMPLE 11

Polymerisation and Copolymerisation of Ethylene in Gaseous Phase in a Mechanically Stirred Reactor 200 g of a dry and deaerated polyethylene powder, as a powder charge, followed by 2 millimoles of TEA, were introduced under nitrogen into a 2.5 liter stainless steel reactor fitted with a stirring system for dry powder, rotating at 250 revolutions per minute. 10 g of the prepolymer (Q) prepared in Example 10 and a gas mixture consisting of hydrogen and ethylene, and in a second run, 4-methyl-pentene-1 were then introduced therein at a total pressure of 0.8 MPa, kept constant by the further addition of ethylene. The operating conditions for the homopolymerisation and copolymerisation of ethylene and the characteristics of the polymers obtained are given in Table 2.

TABLE 2

Polymerisation and Copolymerisation of Ethylene in Gaseous Phase in a Mechanically Stirred Reactor

| Temp. (°C.) | $pH_2/pC_2$ | $pH_6/pC_2$ | Time (h) | Production (g) | $MI_{2.16}$ (g/10 mins) | n |
|---|---|---|---|---|---|---|
| 90 | 0.67 | 0 | 3 | 257 | 7.4 | 1.24 |
| 85 | 0.15 | 0.5 | 3 | 272 | 1.3 | 1.26 |

$pC_6$: partial pressure of 4-methyl-1-pentene

TABLE 1

Polymerisation of Ethylene in Suspension in n-hexane

| Catalyst | $pH_2$ (MPa) | $pC_2$ (MPa) | Time (h) | Prodn. (g) | Dm (microns) | MI 2.16 (g/10 mins) | n | Bulk Density (g/cm³) |
|---|---|---|---|---|---|---|---|---|
| B | 0.074 | 0.074 | 3 | 725 | 236 | 14 | 1.26 | 0.31 |
| D | 0.06 | 0.10 | 3 | 421 | 227 | 7.8 | 1.27 | 0.44 |
| F | 0.1 | 0.07 | 3 | 537 | 281 | 10.3* | 1.34 | 0.39 |
| H | 0.06 | 0.11 | 3 | 285 | 135 | 15 | 1.42 | 0.35 |
| J (comp) | 0.085 | 0.31 | 3 | 26 | — | — | — | — |
| L | 0.088 | 0.12 | 3 | 302 | 170 | 4.1 | 1.26 | 0.41 |
| N | 0.06 | 0.18 | 1.5 | 875 | 395 | 3.2 | 1.44 | 0.33 |
| P | 0.1 | 0.15 | 1.5 | 589 | 250 | — | — | 0.29 |

$pH_2$: partial pressure of hydrogen
$pC_2$: partial pressure of ethylene
Dm: mean diameter by mass of the polymer particles
$MI_{2.16}$: melt index of the polymer, measured under a load of 2.16 kg at 190° C.
n: flow parameter of the polymer calculated according to the equation:
n = log $(MI_{8.5}/MI_{0.325})$/log (8.5/0.325) with $MI_{8.5}$ and $MI_{0.325}$ being the melt indices of the polymer, measured at 190° C. under a load of 8.5 kg and 0.325 kg respectively The bulk density of the polymer powder was determined according to ASTM-D 1895A.

EXAMPLE 12

Polymerisation and Copolymerisation of Ethylene in Gaseous Phase in a Fluidized Bed Reactor 800 g of a dry and deaerated polyethylene powder were introduced, as a powder charge, into a fluidized bed reactor 20 cm in diameter. This powder was fluidized with the aid of an upward gas stream travelling at a velocity of 15 cm/s and consisting of a mixture of hydrogen, ethylene and in the first two runs, but not in the third, 1-butene, at a total pressure of 1.5 MPa. 2 millimoles of TEA were then introduced into the reactor, followed by 30 g of the prepolymer (Q) prepared in Example 10. The total pressure was kept constant at 1.5 MPa by the addition of further ethylene and, when used, butene. TEA was introduced into the reactor sequentially during the polymerisation or copolymerisation. The operating conditions for the polymerisation and copolymerisation of ethylene, and the characteristics of the polymers obtained are given in Table 3.

Polymerisation and Copolymerisation of Ethylene in Gaseous Phase in a Mechanically Stirred Reactor

| Temp. (°C.) | $pH_2/pC_2$ | $pC_4/pC_2$ | TEA added (mmols) | Time (h) | Prodn. (g) | $MI_{2.16}$ (g/10 mins) | n | d (g/cm³) |
|---|---|---|---|---|---|---|---|---|
| 85 | 0.4 | 0.15 | 14 | 3 | 1 850 | 4.5 | 1.24 | 0.945 |
| 85 | 0.15 | 0.35 | 12 | 2.5 | 1 260 | 2.1 | 1.26 | 0.918 |
| 95 | 0.6 | 0 | 16 | 3.5 | 2 040 | 5 | 1.24 | 0.959 |

$pC_4$: partial pressure of 1-butene
d: density of the polymer determined according to ASTM D1505

I claim:

1. A process for the preparation of a solid catalyst of the Ziegler-Natta type comprising reacting a soluble magnesium dialkoxide solubilised in a liquid hydrocarbon with a transition metal halide characterised in that the solid catalyst is precipitated in a liquid hydrocarbon medium by reacting the solution of magnesium dialkoxide and transition metal halide in the presence of at least one alkoxide of a transition metal belonging to subgroups IVb, Vb or VIb of the Periodic Classification of Elements, which transition metal alkoxide is free from halogen and soluble in liquid hydrocarbon and in that the transition metal halide is selected from the group consisting of halides of titanium (IV), halides of vanadium (IV) and halides of VO (III).

2. A process as claimed in claim 1 in which the magnesium dialkoxide has the general formula Mg ($OR_1$)($OR_2$) in which ($OR_1$) and ($OR_2$) are the same or different and are alkoxide or alkoxyalkoxide groups selected from the group consisting of alkoxide groups comprising a linear alkyl radical having from 6 to 12 carbon atoms or a branched alkyl radical having from 5 to 12 carbon atoms and alkoxyalkoxide groups containing from 4 to 12 carbon atoms.

3. A process as claimed in claim 1 in which the transition metal alkoxide is a titanium tetraalkoxide, vanadium tetraalkoxide, zirconium tetraalkoxide or vanadyl trialkoxide.

4. A process as claimed in claim 1 in which the precipitation is carried out in the presence of at least one additional alkoxide of an element belonging to subgroups IIIa or IVa of the Periodic Classification of Elements, the additional alkoxide being soluble in the liquid hydrocarbon medium, containing no halogen and having no function capable of acting reductively towards the transition metal halide.

5. A process as claimed in claim 4 in which the additional alkoxide is selected from the group consisting of a boron trialkoxide, an aluminium trialkoxide or a silicon alkoxide.

6. A process as claimed in claim 5 in which the additional alkoxide is a silicon alkoxide having the general formula $Si(R_7)_n(OR_8)_{4-n}$ in which $R_7$ is an alkyl or aryl radical containing up to 12 carbon atoms, $R_8$ is an alkyl radical containing from 1 to 6 carbon atoms and n is a number from 0 to 3.

7. A process according to claim 1 in which the precipitation is carried out at a temperature in the range from −20° to 100° C. using quantities such that:
   (a) the molar ratio of magnesium dialkoxide to transition metal halide is from 0.2 to 4, and
   (b) the molar ratio of the transition metal alkoxide to transition metal halide is from 0.1 to 2.

8. A process as claimed in claim 7 and claim 4 in which the molar ratio of transition metal alkoxide to additional alkoxide is from 0.5 to 20.

9. A process as claimed in claim 1 in which the solid catalyst is separated from the hydrocarbon medium and consists of spheroidal particles having a mean diameter by mass, Dm, of from 10 to 70 microns and a narrow particle size distribution such that the ratio of mean diameter by mass to mean diameter by number, Dn, is greater than 1.2 and less than 2.0.

10. A process as claimed in claim 9 in which the solid catalyst separated from the liquid hydrocarbon medium has a particle size distribution such that 90% by weight of the solid catalyst consists of particles having a diameter in the range Dm±10%, where Dm is the mean diameter by mass.

11. A solid, non-supported particulate catalyst of the Ziegler-Natta type obtainable by the process of claim 1 comprising magnesium, transition metal, halogen, and alkoxide groups, wherein the particles are spheroidal particles having a mean diameter by mass from 10 to 70 microns and a ratio of mean diameter by mass, Dm, to mean diameter by number, Dn, which is greater than 1.2 and smaller than 2.0, and the catalyst contains no electron donor compound or an electron donor compound in a small quantity such that the molar ratio of the electron donor compound to the transition metal is less than 0.2, the said transition metal being at its maximum valency or vanadyl groups.

12. A solid catalyst as claimed in claim 11 in which the transition metal is selected from the group consisting of titanium IV, vanadium IV and vanadium V in a vanadyl group.

13. A solid catalyst as claimed in claim 11 in which the atomic ratio of halogen to magnesium is from 1.7 to 2.3 and the atomic ratio of transition metal to magnesium is from 0.1 to 0.3.

14. A solid catalyst as claimed in claim 11 in which the electron donor compound is selected from the group consisting of amines, amides, phosphines, sulphoxides, sulphones, ethers, thioethers, ketones, aldehydes, alcohols, thiols and carboxylic acid esters.

15. A solid catalyst as claimed in claim 11 which has an halogen content by weight comprises between 30% and 45%.

* * * * *

UNITED STATES PATENT AND TRADEMARK OFFICE
CERTIFICATE OF CORRECTION

PATENT NO. : 5,006,499
DATED : April 9, 1991
INVENTOR(S) : ERIC DAIRE

It is certified that error appears in the above-identified patent and that said Letters Patent is hereby corrected as shown below:

Col. 13, l. 20, "Table 3" should be on a separate line

Col. 13, l. 22, delete "mechanically stirred" and insert --Fluidized Bed-- therefor Signed and Sealed this Twenty-ninth Day of September, 1992

Attest:

DOUGLAS B. COMER

Attesting Officer   Acting Commissioner of Patents and Trademarks